US012709815B2

(12) United States Patent
Chen et al.

(10) Patent No.: US 12,709,815 B2
(45) Date of Patent: Aug. 18, 2026

(54) NICKEL-CHROMIUM-ALUMINUM COMPOSITE BY ELECTRODEPOSITION

(71) Applicant: RTX Corporation, Farmington, CT (US)

(72) Inventors: Lei Chen, South Windsor, CT (US); William J. Brindley, Hebron, CT (US); Monika D. Kinstler, Manchester, CT (US)

(73) Assignee: RTX CORPORATION, Farmington, CT (US)

(*) Notice: Subject to any disclaimer, the term of this patent is extended or adjusted under 35 U.S.C. 154(b) by 134 days.

(21) Appl. No.: 16/889,281

(22) Filed: Jun. 1, 2020

(65) Prior Publication Data

US 2020/0291780 A1 Sep. 17, 2020

Related U.S. Application Data

(62) Division of application No. 15/102,975, filed as application No. PCT/US2014/068580 on Dec. 4, 2014, now Pat. No. 10,669,851.

(Continued)

(51) Int. Cl.

*F01D 5/28* (2006.01)
*C22C 19/05* (2006.01)

(Continued)

(52) U.S. Cl.

CPC .............. *C25D 5/67* (2020.08); *C22C 19/058* (2013.01); *C22F 1/10* (2013.01); *C25D 3/562* (2013.01);

(Continued)

(58) Field of Classification Search

CPC . F01D 5/005; F01D 5/288; F01D 9/02; F05D 2230/31; F05D 2230/80;

(Continued)

(56) References Cited

U.S. PATENT DOCUMENTS

| | | | |
|---|---|---|---|
| 2,763,921 | A | 9/1956 | Turner et al. |
| 3,338,733 | A | 8/1967 | Rowady |

(Continued)

FOREIGN PATENT DOCUMENTS

| | | | |
|---|---|---|---|
| CA | 2854367 | A1 | 5/2013 |
| EP | 2623644 | A1 | 8/2013 |

(Continued)

OTHER PUBLICATIONS

"Inconel alloy 625"; Aug. 13, 2013; Special Metals Corportation, Table 1; 18 pgs.

(Continued)

*Primary Examiner* — Courtney D Heinle
(74) *Attorney, Agent, or Firm* — CANTOR COLBURN LLP

(57) ABSTRACT

An electrodeposited nickel-chromium-aluminum (Ni—Cr—Al) composite including nickel-chromium alloy and aluminum, and alloys or compounds formed by Al, Cr and Ni applied on turbine components comprises from 2 to 50 wt % chromium, from 0.1 to 6 wt % aluminum, and a remaining balance of nickel, wherein the Ni—Cr—Al composite is heat-treated to form an aluminum compound and to restore materials lost during repair processes of the turbine components.

5 Claims, 5 Drawing Sheets

Related U.S. Application Data

(60) Provisional application No. 61/914,307, filed on Dec. 10, 2013.

(51) Int. Cl.

| | |
|---|---|
| ***C22F 1/10*** | (2006.01) |
| ***C25D 3/56*** | (2006.01) |
| ***C25D 3/66*** | (2006.01) |
| ***C25D 5/00*** | (2006.01) |
| ***C25D 5/12*** | (2006.01) |
| ***C25D 5/18*** | (2006.01) |
| ***C25D 5/50*** | (2006.01) |
| ***C25D 7/00*** | (2006.01) |
| ***C25D 17/10*** | (2006.01) |
| ***F01D 5/00*** | (2006.01) |
| ***F01D 9/02*** | (2006.01) |

(52) U.S. Cl.
CPC ............... *C25D 3/665* (2013.01); *C25D 5/12* (2013.01); *C25D 5/18* (2013.01); *C25D 5/50* (2013.01); *C25D 7/008* (2013.01); *C25D 17/10* (2013.01); *F01D 5/005* (2013.01); *F01D 5/288* (2013.01); *F01D 9/02* (2013.01); *F05D 2220/30* (2013.01); *F05D 2230/31* (2013.01); *F05D 2230/80* (2013.01); *F05D 2230/90* (2013.01); *F05D 2300/121* (2013.01); *F05D 2300/177* (2013.01)

(58) Field of Classification Search
CPC ........... F05D 2230/90; F05D 2300/121; F05D 2300/177; C25D 5/67; C25D 3/562; C25D 5/12; C25D 5/50; C22C 19/058; C22F 1/10
See application file for complete search history.

(56) References Cited

U.S. PATENT DOCUMENTS

| | | | | |
|---|---|---|---|---|
| 3,748,110 | A | 7/1973 | Hodshire et al. | |
| 3,763,002 | A | 10/1973 | Skomoroski et al. | |
| 3,810,782 | A | 5/1974 | Gallmiche | |
| 3,917,517 | A | 11/1975 | Jordan et al. | |
| 3,998,603 | A | 12/1976 | Rairden, III | |
| 4,153,453 | A | 5/1979 | Hart et al. | |
| 4,259,037 | A | 3/1981 | Anderson | |
| 4,461,680 | A | 7/1984 | Lashmore | |
| 5,126,213 | A | 6/1992 | Restall | |
| 5,500,252 | A * | 3/1996 | Meelu | C23C 10/58 427/376.6 |
| 5,543,183 | A | 8/1996 | Streckert et al. | |
| 5,908,285 | A | 6/1999 | Graff | |
| 6,015,630 | A | 1/2000 | Padture et al. | |
| 6,129,991 | A * | 10/2000 | Warnes | C23C 28/021 428/668 |
| 6,331,217 | B1 | 12/2001 | Burke et al. | |
| 7,285,337 | B2 | 10/2007 | Narita et al. | |
| 10,378,118 | B2 | 8/2019 | Chen et al. | |
| 2002/0130047 | A1 | 9/2002 | Allen et al. | |
| 2004/0054231 | A1 | 3/2004 | Abbott et al. | |
| 2006/0029723 | A1 | 2/2006 | Rigney et al. | |
| 2006/0093752 | A1 * | 5/2006 | Darolia | C23C 14/16 427/523 |
| 2006/0251916 | A1 | 11/2006 | Arikawa et al. | |
| 2007/0059486 | A1 | 3/2007 | Anton et al. | |
| 2008/0017280 | A1 | 1/2008 | Vargas et al. | |
| 2009/0162209 | A1 * | 6/2009 | Wortman | F01D 5/288 416/241 R |
| 2010/0158681 | A1 | 6/2010 | Nemoto et al. | |
| 2010/0252446 | A1 | 10/2010 | Kuzmanovic et al. | |
| 2011/0065804 | A1 | 3/2011 | Diddario et al. | |
| 2013/0122317 | A1 | 5/2013 | Cheruvu et al. | |
| 2013/0168825 | A1 | 7/2013 | Bhattacharya | |
| 2013/0199934 | A1 | 8/2013 | Parkos, Jr. et al. | |
| 2014/0044986 | A1 * | 2/2014 | Pillhoefer | C23C 10/20 427/404 |
| 2016/0002803 | A1 | 1/2016 | Sklar | |
| 2016/0031186 | A1 | 2/2016 | Mourer et al. | |
| 2016/0312627 | A1 | 10/2016 | Chen et al. | |
| 2016/0320502 | A1 | 11/2016 | Chen et al. | |
| 2017/0100804 | A1 | 4/2017 | Goncharov et al. | |
| 2019/0072683 | A2 | 3/2019 | Chen et al. | |
| 2019/0368061 | A1 | 12/2019 | Chen et al. | |
| 2020/0291797 | A1 | 9/2020 | Chen et al. | |

FOREIGN PATENT DOCUMENTS

| | | | |
|---|---|---|---|
| GB | 749909 | A | 6/1956 |
| GB | 1233090 | A | 5/1971 |

OTHER PUBLICATIONS

Abbott et al., "Ionic Liquid Analogues Formed from Hydrated Metal Salts", Chemical European Journal, vol. 10, 2004, pp. 3769-3774.
Endres et al., Electrodeposition from Inoic Liquids 353 (Year: 2008), 15 pages.
European Search Report for European Application No. 14869187.6, dated Jul. 11, 2017, 10 pages.
European Search Report for European Application No. 14869585.1 dated Jul. 11, 2017, 25 pages.
European Search Report for European Application No. 14870576.7, dated Jul. 11, 2017, 10 pages.
International Search Report and Written Opinion for International Application No. PCT/US2014/068580, Mailed Feb. 11, 2015.
International Search Report for Application No. PCT/US14/68447; Date of Mailing: Feb. 11, 2015.
International Search Report for International application No. PCT/US14/68445; International filing date: Dec. 3, 2014; Date of Mailing: Oct. 16, 2015; 4 pgs.
International Written Opinion for International application No. PCT/US14/68445; International filing date: Dec. 3, 2014; Date of Mailing: Oct. 16, 2015; 4 pgs.
Liana Anicia, Andreea Florea and Teodor Visan (2011). Steudies Regarding teh Nickel Electrodeposition Choline Chloride Based Ionic Liquids, Applications of Ionic Liquids in Science and Technology, Prof. Scott Handy (Ed.), ISBN: 978-953-307-605-8 (Year: 2011).
Lou et al., Electroplating, Encyclopedia of Chem. Proc. (Year: 2006), 10 pages.
Saravanan et al., "Electrodeposition of Fe—Ni—Cr alloy from Deep Eutectic System containing Choline chloride and Ethylene Glycol", International Journal of Electrochemical Science, vol. 6, 2011, pp. 1468-1478.
Written Opinion for International Application No. PCT/US14/68447; Date of Mailing: Feb. 11, 2015.
Xu et al., "Ni—Cr alloy electrodepositing technology on Fe substrate and coating performance", Journal of Central South University of Technology, vol. 14, No. 2, 2007, pp. 181-185.
Y.H. You et al./Surface & Coatings Technology 206 (2012) 3632-3638 (Year: 2012).
Non-Final Office Action issued in U.S. Appl. No. 16/538,493, filed Jun. 3, 2022, 19 pages.
Non-Final Office Action issued in U.S. Appl. No. 16/889,248, filed May 9, 2022, 21 pages.
Final Office Action for U.S. Appl. No. 16/538,493 dated Sep. 19, 2022, pp. 1-13.
US Non-Final Office Action for U.S. Appl. No. 16/538,493 dated Dec. 30, 2022, pp. 1-10.
US Non-Final Office Action issued in U.S. Appl. No. 16/889,248 dated Feb. 1, 2023, pp. 1-22.

* cited by examiner

NICKEL-CHROMIUM-ALUMINUM COMPOSITE BY ELECTRODEPOSITION

CROSS REFERENCE TO RELATED APPLICATIONS

This application is a division of U.S. patent application Ser. No. 15/102,975, filed on Jun. 9, 2016, which is a National Phase Application of Patent Application PCT/US2014/068580 filed on Dec. 4, 2014, which claims priority to U.S. Provisional Application No. 61/914,307 filed Dec. 10, 2013, all of which is hereby incorporated by reference in their entirety.

FIELD OF USE

The present disclosure relates to a composite including nickel-chromium alloy and aluminum, and alloys or compounds formed by nickel, chromium and aluminum, and more particularly to a nickel-chromium-aluminum (Ni—Cr—Al) alloy applied to gas turbine parts for wall restoration and bond coat, a method for electrodepositing the Ni—Cr—Al alloy and associated heat treatment, and coated articles.

BACKGROUND

High and low pressure turbine parts including turbine vanes or airfoils are made of nickel based superalloys. These components are protected against the high temperature environment by a thermal barrier coating (TBC). In the TBC, a bond coat disposed in between the top oxide layer and the substrate superalloy provides an aluminum reservoir, which supply aluminum diffusing outwards to form protective α-$Al_2O_3$, an adherent thermally grown oxide (TGO). Thus, the bond coat is critical for protecting gas turbine components from high temperature oxidation. Like aluminum, chromium tends to form dense oxide chromia in a high temperature environment, providing hot corrosion protection. These elements allow the parts made from nickel alloys to perform well in gas turbine engines.

Turbine vanes are occasionally removed from service due to the loss of wall thickness during such repair processes as coating stripping, recoating, grit blast cleaning, and chemical processing which typically remove some base metal and often reduce component wall thicknesses below the required minimum thickness.

Thinned turbine vanes or airfoils are either replaced with new parts or scrapped unless the lost wall thickness is restored by adding metal materials that include key elements (e.g., Cr and Al) lost during the repair processes.

Accordingly, it is desirable to restore the lost wall thickness of turbine vanes or airfoils by providing a metal coating layer that includes key elements (e.g., Cr and Al) lost during the repair processes to increase the number of repair cycles for the vanes or airfoils.

SUMMARY

The present disclosure relates to a composite including nickel-chromium alloy and aluminum, and alloys or compounds formed by nickel, chromium-and aluminum applied to gas turbine components for wall restoration or enhanced bond coat. Specifically, Ni—Cr alloy and Al are sequentially electro-deposited from environmentally benign ionic liquid chemicals. The Ni—Cr—Al composite is subsequently heat-treated to form a diffused Ni—Cr—Al alloy having a composition that mimics the main chemistry of the base alloy, e.g., Ni-based superalloy. The diffused Ni—Cr—Al alloy allows to restore materials lost during the repair processes, and contributes to prolong the lifetime of the turbine parts that are subject to high temperature environment and repeated repair processes.

According to an aspect of the present disclosure, a coated article includes a turbine component and a Ni—Cr alloy and an Al deposit coated on the turbine component, wherein the Ni—Cr—Al composite alloy includes from 2 to 50 wt % chromium, from 0.1 to 6 wt % aluminum, and remaining nickel, and wherein the Ni—Cr—Al composite is heat-treated to form a diffused Ni—Cr—Al alloy that includes an aluminum compound (aluminides) formed by nickel and aluminum and to restore materials lost during repair processes of the turbine component.

According to another aspect of the present disclosure, a method for forming a nickel-chromium-aluminum (Ni—Cr—Al) composite and associated alloys on a turbine component is disclosed. The method includes providing a first plating bath for Ni—Cr alloy deposition, which is made from a solution including a solvent, a surfactant, and an ionic liquid (deep eutectic solvent), including choline chloride, nickel chloride, and chromium chloride, wherein a molar ratio of the choline chloride and chromium chloride ranges from 0.5 to 3.5 and the solvent comprises from 5 to 80 vol. % relative to a mixture of the choline chloride and metal chlorides including the nickel and chromium chlorides.

The method further includes electrodepositing a Ni—Cr alloy on the turbine component coupled to a cathode by providing an external supply of current to the cathode and an anode in the first plating bath. In addition, the method includes providing a second plating bath made from an ionic liquid including Lewis acidic 1-ethyl-3-methylimidazolium chloride or 1-butyl-3-methylimidazolium chloride and an aluminum compound such aluminum chloride ($AlCl_3$), and electrodepositing an aluminum (Al) onto the Ni—Cr alloy in the second plating bath. The method further includes heat-treating the electrodeposited composite Ni—Cr alloy and Al layer at a high temperature to form a diffused Ni—Cr—Al alloy that includes an aluminum compound primarily formed between nickel and aluminum, and to restore materials lost during repair processes of the turbine component.

The details of one or more embodiments of the present disclosure and other benefits are set forth in the accompanying drawings and the description below. Other features, objects, and advantages of the present invention will be apparent from the description and drawings, and from the claims.

The drawings depict various preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
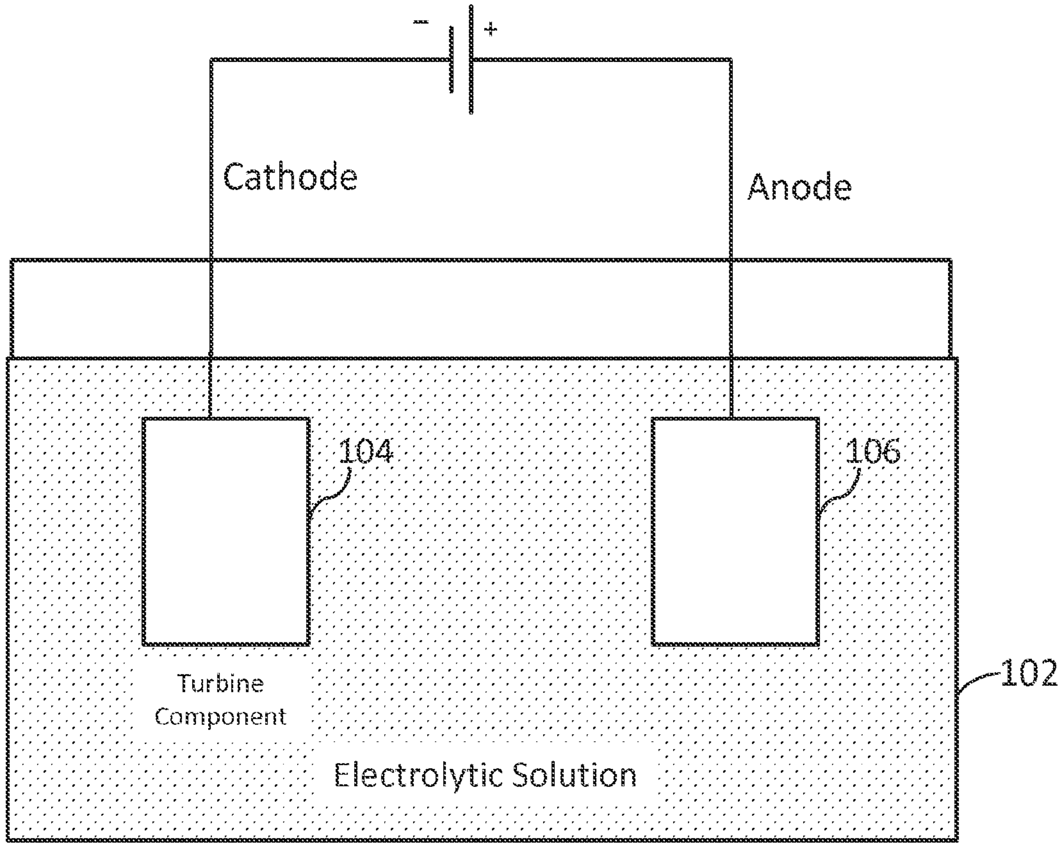
FIG. 1 illustrates an example of a plating bath filled with an electrolytic solution for electrodepositing either a Ni—Cr alloy or aluminum on a turbine component according to an aspect of the present disclosure.

FIG. 1 illustrates an example of a plating bath filled with an electrolytic solution for electrodepositing a Ni—Cr alloy or aluminum on a turbine component according to an aspect of the present disclosure. A turbine component 104 which is to be plated with a Ni—Cr alloy and aluminum respectively is pre-treated prior to electrodeposition. A pre-treatment is typically performed to remove grease, oil, oxides and debris from the turbine component by mechanical abrasion, acid or alkaline etching, and/or electro-etching followed by surface activation, but is not specifically limited to the above processing steps and specified sequence.

Referring now to FIG. 1, there is provided a plating bath 102 containing an electrolytic solution that includes a room temperature ionic liquid including choline chloride, nickel chloride, chromium chloride, solvents, and surfactants like anionic, cationic, or Zwitterionic (amphoteric) surfactants. One of the surfactants includes one of more species of a sodium dodecyl sulfate, fluorosurfactants, cetyl trimethylammonium bromide (CTAB), or cetyl trimethyammonium chloride (CTAC). It is noted that the choline chloride based processing is low-cost and environmentally friendly. In one embodiment, a molar ratio of the choline chloride and chromium chloride ranges from 0.5 to 3.5, and polar aprotic and polar protic solvents are used to adjust the viscosity and conductivity of the plating bath 102 to attain a high quality Ni—Cr alloy coating.

Specifically, protic solvents are preferred due to their ability to donate hydrogen bonds. The solvents further include formic acid, citric acid, Isopropanol (IPA), water, acetic acid, and ethylene glycol. In the embodiment, preferred solvent content is from 10 to 80 vol % relative to the mixture of choline chloride and metal chlorides including nickel and chromium chlorides.

Referring to FIG. 1, an external supply of current is provided to an anode 106 and a cathode which is a turbine component 104 to be plated with Ni and Cr. The current can be a direct current or an alternating current including a pulse or pulse reverse current (not shown). The amount of current supplied can be controlled during the electrodeposition to achieve a desired coating composition, density, and morphology.

When the current is supplied, the metal (Ni and/or Cr) at the anode is oxidized from the zero valence state to form cations with a positive charge. These cations, generally forming complexes with the anions in the solution, are reduced at the cathode to produce metallic deposit. The result is the reduction of Ni and Cr species from the electrolytic solution onto the turbine component to be restored. The turbine component 104 is a cathode during electrodeposition. The electrodeposition inevitably decomposes water in the bath 102, and thus the solution in the bath can be replenished to maintain consistent deposition quality.

The anode 106 includes a Ni—Cr alloy anode, a Ni and/or Cr anode, or any combination of these materials that can be chosen to satisfy different requirements. An insoluble catalytic anode (catalyzing oxygen evolution electrode) is preferred, but the type of anode used is not specifically limited to the above anode. A second layer of aluminum is deposited from a different plating bath, where the anode is pure aluminum. Aluminum electrodeposition is conducted in a water free environment and has been known to approach 100% efficiency because both hydrogen evolution and oxygen evolution are avoided.

In one embodiment, the Ni—Cr alloy includes from 2 to 50 wt % chromium and a remaining weight percentage of nickel. In a preferred embodiment, the Ni—Cr alloy comprises from 8 to 20 wt % chromium, and a remaining weight percentage of nickel. The electrodeposited Ni—Cr alloy is thicker than at least 10 μm. In a preferred embodiment, the electrodeposited Ni—Cr alloy is thicker than 125 μm. The top aluminum layer can vary in thickness, ranging from 2 μm to more than 125 μm.

Figure 2:
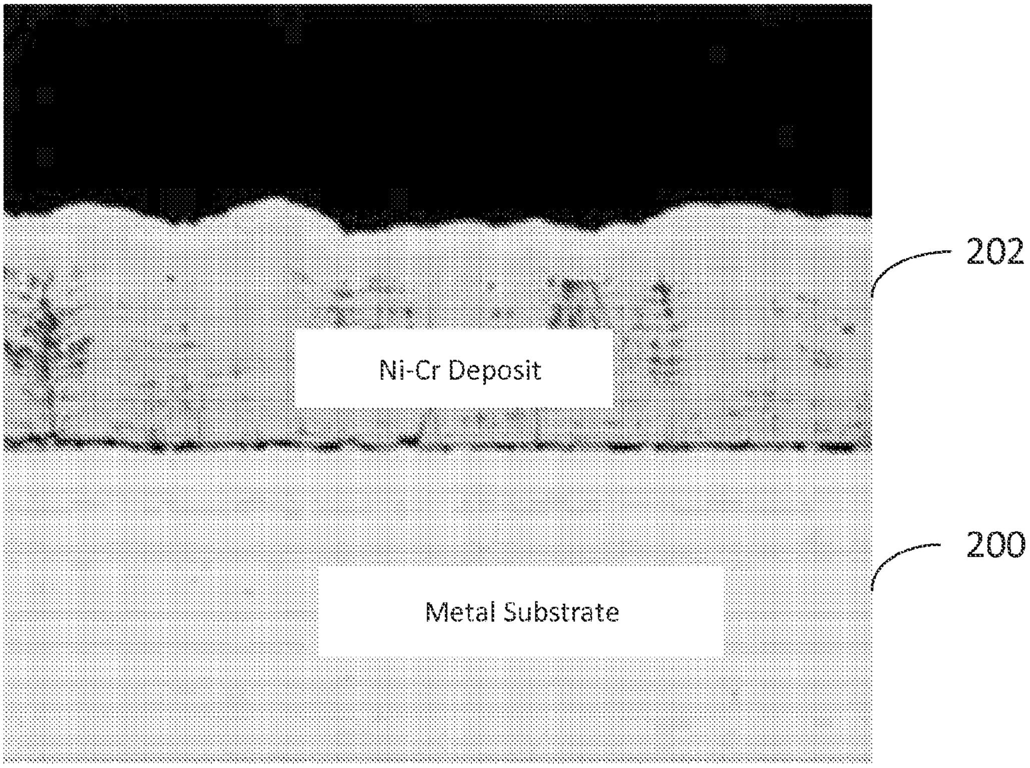
FIG. 2 is a cross-sectional view of a Ni—Cr alloy electrodeposited on a metal substrate in a choline chloride-mixed metal chlorides solution.

FIG. 2 is a cross-sectional view of the Ni—Cr alloy 202 formed on a metal substrate 200 in a choline chloride-mixed metal chlorides solution. Referring to FIG. 2, a Ni—Cr coating thicker than about 70 μm is formed on the substrate 200. The Ni—Cr coating 202 and aluminum deposit may be applied directly to a surface of a turbine component which is formed from a wide range of metallic materials including, but not limited to, a single crystal nickel-based superalloy, and the copper substrate 200 represents a turbine component. The Ni—Cr aluminum composite 202 coated on a turbine component is subject to a post heat-treatment to homogenize the composition and add wall thickness back to the turbine component and replenish chromium and aluminum lost during the repair of the component.

Figure 3:
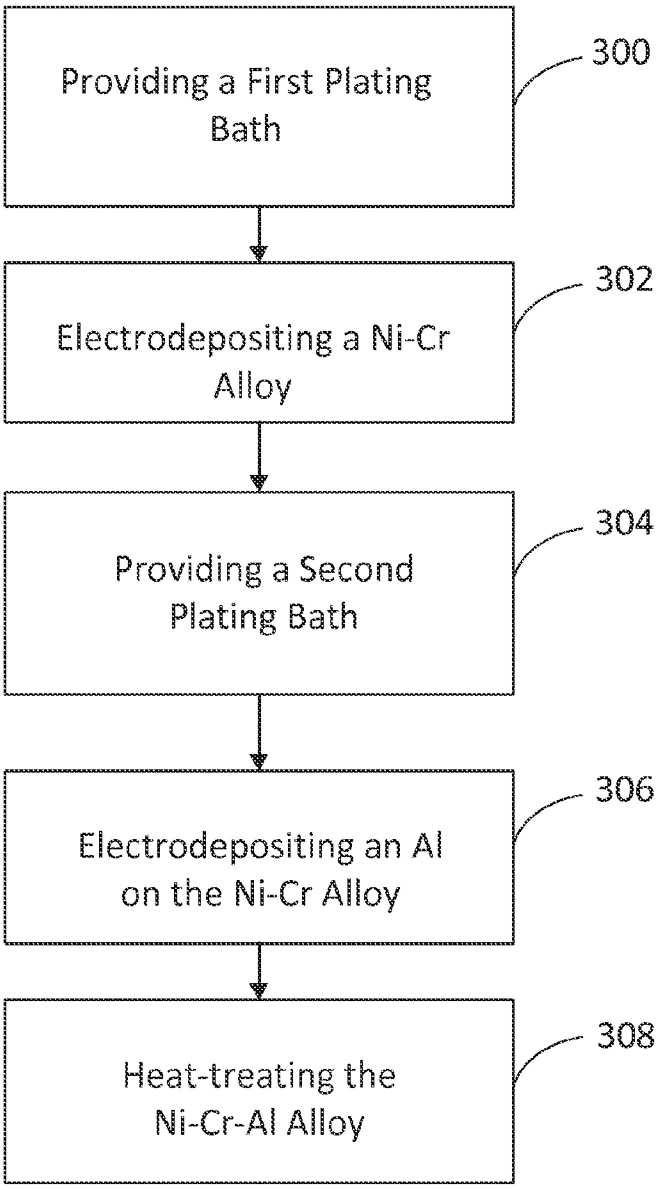
FIG. 3 is a flow chart of a Ni—Cr—Al composite layer deposition process of the present disclosure.

FIG. 3 is a process flow chart of applying a Ni—Cr aluminum composite layer described in the present disclosure. Typically, a turbine component to be coated with a Ni—Cr—Al composite layer is pre-treated prior to the electrodeposition to remove foreign materials like debris, oxides and grease/oil from its surface. A method for electrodepositing a nickel-chromium-aluminum (Ni—Cr—Al) alloy on a turbine component begins at step 300 where a first plating bath filled with a solution is provided. The solution includes a solvent, a surfactant, and an ionic liquid including choline chloride, nickel chloride, and chromium chloride, wherein a molar ratio of the choline chloride and chromium chloride ranges from 0.5 to 3.5, and the solvent comprises from 5 to 80 vol. % relative to a mixture of the choline chloride and metal chlorides including the nickel and chromium chlorides, as disclosed above with reference to FIG. 1.

At step 302, electrodepositing a Ni—Cr alloy on the turbine component is performed. An external supply of current is provided to a cathode and an anode in the first plating bath. The turbine component is the cathode, and a metal source is the anode. The component coated with Ni—Cr alloy is then rinsed and dried and prior to aluminum deposition. Additional surface preparation required for aluminum deposition is also performed. At step 304, a second plating bath filled with an ionic liquid including Lewis acidic 1-ethyl-3-methylimidazolium chloride or 1-butyl-3-methylimidazolium chloride and an aluminum salt is provided for aluminum deposition on the Ni—Cr alloy coated component. At step 306, electrodepositing aluminum (Al) onto the Ni—Cr alloy is performed in the second plating bath to form a Ni—Cr—Al composite on the turbine component. Once the Ni—Cr—Al composite is formed on the turbine component, at step 308, a post heat-treatment of the Ni—Cr—Al alloy at 1100° C. or at a higher temperature is applied to the coated article to homogenize the composition, to form alloys and intermetallic compounds, and to restore key materials lost during previous repair processes or service of the turbine component, as shown in FIGS. 4A and 4B.

Figure 4A:
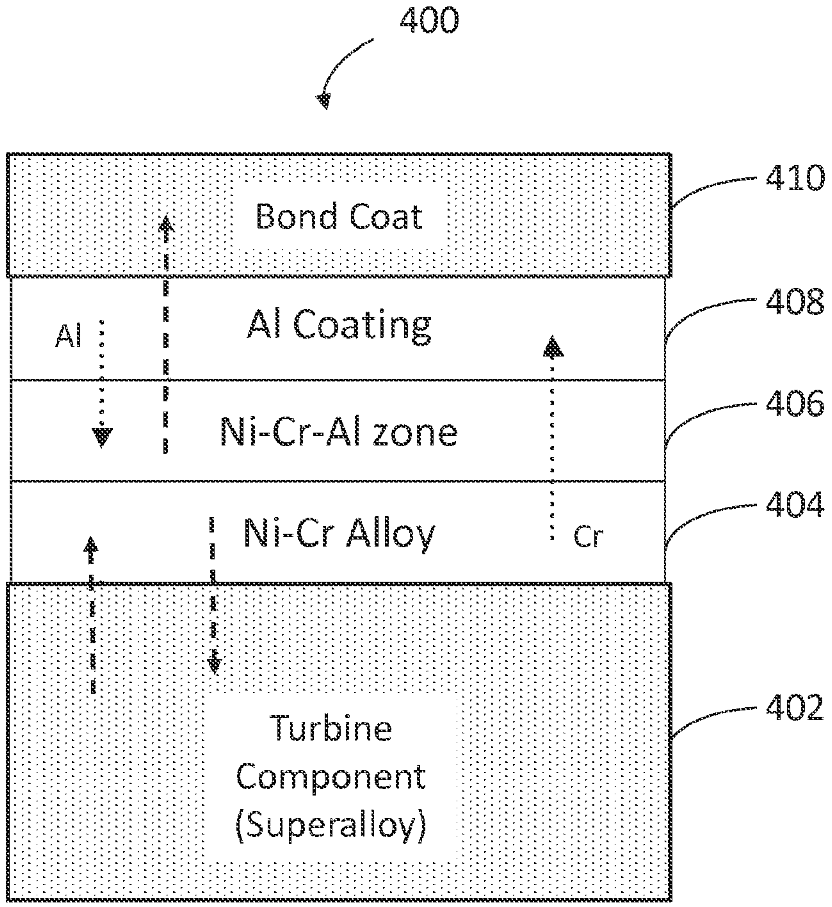
FIG. 4A is a schematic cross-sectional view of a diffused Ni—Cr—Al composite alloy coated on a turbine component.
Figure 4B:
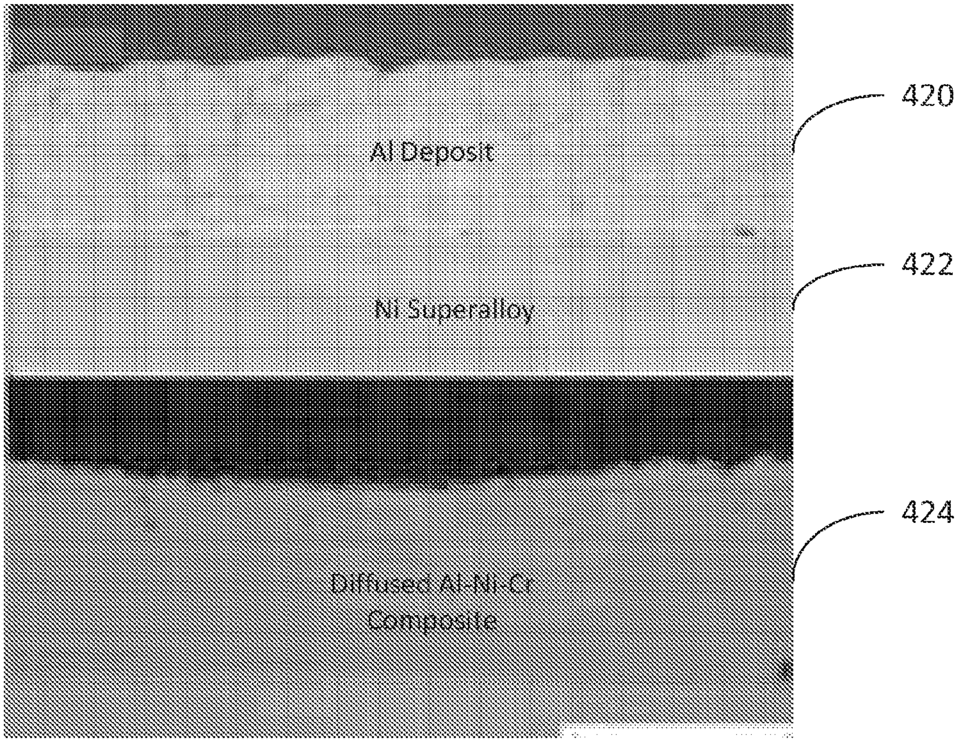
FIG. 4B is a micrograph of a diffused Al coated Ni superalloy.

FIG. 4A is a cross-sectional view of a diffused Ni—Cr—Al alloy coated on a turbine component. The coated article 400 comprises a turbine component 402 which is typically made of Ni-based superalloy, a Ni—Cr alloy 404, a Ni—Cr—Al zone 406, an Al coating 408, and a bond coat 410 which is typically re-applied after the dimensional restoration of the turbine component.

The coated article 400 is subject to a post heat-treatment at a high temperature as described above to form a diffused Ni—Cr—Al alloy 404/406/408. Referring to FIG. 4, aluminum (Al) diffuses from Al coating 408 to Ni—Cr alloy 404 to form a Ni—Cr—Al zone 406, chromium (Cr) diffuses from the Ni—Cr alloy 404 to the Al coating 408, and Ni and/or Cr from the Ni—Cr alloy 404 diffuses into bond coat 410 and turbine component 402, respectively, to homogenize the composition, to form an aluminum compound between nickel and aluminum, and to restore materials lost during previous repair processes of the turbine component. FIG. 4B is a micrograph of an Al deposit 420 on a Ni superalloy 422 before heat-treatment, and a diffused Al coated Ni superalloy 424 after heat-treatment at a high temperature.

In one embodiment, the Ni—Cr—Al composite includes from 2 to 50 wt % chromium, from 0.1 to 6 wt % aluminum, and a remaining weight percentage of nickel. In the embodiment, the electrodeposited Ni—Cr—Al alloy is thicker than 10 μm. In a preferred embodiment, the Ni—Cr—Al alloy includes from 8 to 20 wt % chromium, from 0.1 to 6 wt % aluminum, and a remaining balance of nickel. In the preferred embodiment, the electrodeposited Ni—Cr—Al composite is thicker than 125 μm. The coated article includes turbine vanes, rotor blades, or stators.

It is to be understood that the disclosure of the present invention is not limited to the illustrations described and shown herein, which are deemed to be merely illustrative of the best modes of carrying out the invention, and which are susceptible to modification of form, size, arrangement of parts, and details of operation. The disclosure of the present invention rather is intended to encompass all such modifications which are within its spirit and scope of the invention as defined by the following claims.

What is claimed is:

1. A coated article, comprising:

a turbine component;

a Ni—Cr—Al composite coated on a surface of the turbine component, the Ni—Cr—Al composite including a Ni—Cr coating on the turbine component and an aluminum coating on the Ni—Cr coating, wherein the Ni—Cr coating comprises from 2-50 wt % chromium and the balance of nickel; and a bond coat on the aluminum coating;

wherein the Ni—Cr—Al composite coated on the surface comprises from 2 to 50 wt % chromium, from 0.1 to 6 wt % aluminum, and a remaining balance of nickel, wherein the Ni—Cr—Al composite is heat-treated to form a diffused Ni—Cr—Al alloy between the Ni—Cr coating and the aluminum coating that includes an aluminum compound formed between nickel and aluminum; and wherein the heat-treated diffused Ni—Cr—Al alloy on the surface of the turbine component includes aluminum diffused from the aluminum coating to the Ni—Cr coating to form a Ni—Cr—Al zone, and chromium diffused from the Ni—Cr coating to the aluminum coating, and Ni and Cr from the Ni—Cr coating diffused through the aluminum coating and into the bond coat, and Ni and Cr diffused from the Ni—Cr coating into the surface of the turbine component; and wherein the surface of the turbine component includes an Ni—Cr alloy and aluminum wherein the Ni—Cr—Al alloy is thicker than 250 μm.

2. The coated article of claim 1, wherein the Ni—Cr—Al composite coated on the surface comprises from 8 to 20 wt % chromium, from 0.1 to 6 wt % aluminum, and a remaining weight percentage of nickel.

3. The coated article of claim 1, wherein the turbine component is a vane, a rotor blade, or a stator.

4. The coated article of claim 1, wherein the turbine component is a repaired turbine component.

5. The coated article of claim 1, wherein the turbine component comprises a single crystal nickel-based superalloy.

* * * * *